United States Patent [19]
Wheeler, Jr.

[11] 3,771,295
[45] Nov. 13, 1973

[54] SEPARATER APPARATUS FOR HANDLING COMPRESSED AIR

[76] Inventor: Harry L. Wheeler, Jr., 1538 Huntingdon Trail, Dunwoody, Ga.

[22] Filed: Mar. 29, 1971

[21] Appl. No.: 129,264

Related U.S. Application Data

[62] Division of Ser. No. 846,339, July 31, 1969, Pat. No. 3,653,465.

[52] U.S. Cl........................ 55/424, 55/449, 55/466
[51] Int. Cl............................................. B01d 45/12
[58] Field of Search..................... 55/337, 391, 449, 55/424, 457, 459, 466; 184/55 A, 55 R

[56] References Cited
UNITED STATES PATENTS

| | | | |
|---|---|---|---|
| 192,313 | 6/1877 | Watson | 55/337 |
| 630,023 | 8/1899 | Baker | 55/DIG. 23 |
| 715,649 | 12/1902 | Engle | 55/457 |
| 2,692,655 | 10/1954 | Peeps | 55/457 |
| 3,364,658 | 1/1968 | Walker | 55/466 |
| 3,703,069 | 11/1972 | Wheeler, Jr. | 55/337 |

FOREIGN PATENTS OR APPLICATIONS

| 885,535 | 12/1961 | Great Britain | 210/304 |
|---|---|---|---|

*Primary Examiner*—Bernard Nozick
*Attorney*—Patrick F. Henry

[57] ABSTRACT

A compressed air filter comprising a tube in which there is an inner wall dfining an upper chamber which has its upper end closed by means of a plate that contains an inlet which opens into the chamber and there being a centrally located outlet which opens from said chamber. The inlet is adjacent to the inner wall and has a deflector means by which a mixture of air, solid particles oil and water droplets are moved downwardly in and to the upper chamber by swirling. There is an egg-shaped cylindrical tube attached to the plate which is approximately concentric within the inner wall and has a length greater than the wall defining a downward opening three-dimensional cylindrical annulus which varies across section containing the inlet opening so that incoming swirling mixture is accelerated in passing the narrowest point. A filter element is supported inside the egg-shaped cylinder which covers the outlet opening to filter solid particles in the mixture and a cylindrical tube which has its lower end closed by a plate. There is also a porous substance providing a filter means above a sump.

7 Claims, 4 Drawing Figures

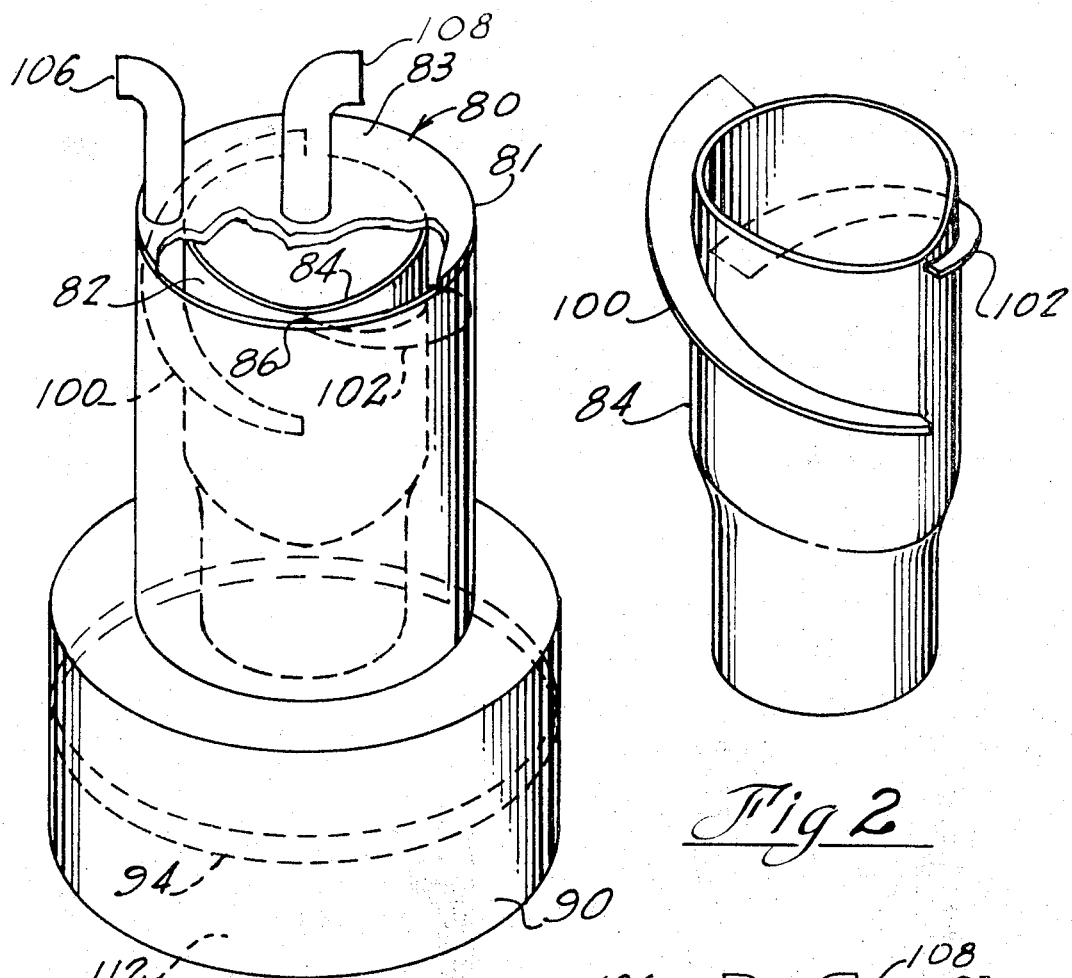
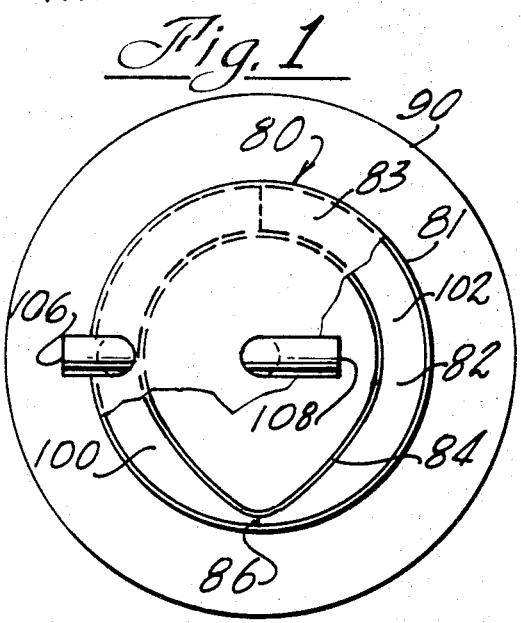
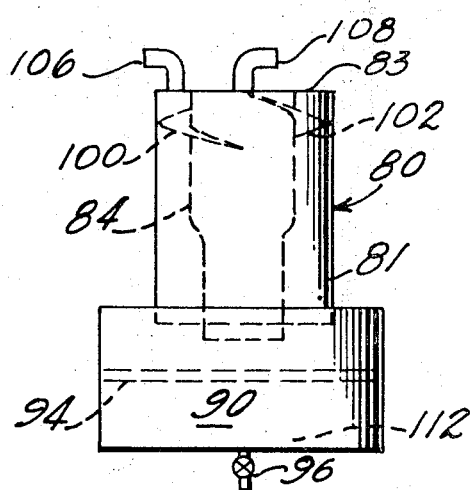
PATENTED NOV 13 1973
3,771,295
Fig. 1
Fig. 2
Fig. 3
Fig. 4
INVENTOR
HARRY L. WHEELER Jr
BY
ATTORNEY

SEPARATER APPARATUS FOR HANDLING COMPRESSED AIR

This application is a division of Ser. No. 846,339 filed July 31, 1969 now U.S. Pat. No. 3,653,465 issued on Apr. 4, 1972.

BACKGROUND OF THE INVENTION

1. Field of the Invention

The handling of a gas and a separator which is classified in Class 55, Subclass 1.

2. Description of the Prior Art

The prior art is discussed in the specification of the above noted related patent and also in the prosecution thereof.

SUMMARY OF THE INVENTION

An object of this invention is to provide a compressed air filter to separate and distribute the separated liquid from a mixture passing from an inlet to an outlet in the compressed air filter device by means of swirling an egg-shaped tube.

Other and further objects and advantages of this invention will become apparent upon reading the following specification, the abstract of the disclosure, and the claims with reference to the accompanying drawings.

BRIEF DESCRIPTION OF THE DRAWINGS

FIG. 1 is a perspective view of a separation chamber arrangement for handling water in the compressed air lines.

FIG. 2 is a perspective view of the inside cylinder shown in FIG. 1.

FIG. 3 is a top plan view of the device shown in FIG. 1.

FIG. 4 is a side elevation view of the device shown in FIG. 1.

DESCRIPTION OF A PREFERRED EMBODIMENT

With reference to FIGS. 1–4, inclusive, the device in general is designated by reference numeral 80 and comprises a cylinder 81 having a chamber 82 therein and having its upper end closed by a plate 83, which is concentric with a slightly egg-shaped and longer inner cylinder 84, the upper end of which is also closed by plate 83. A top view of the arrangement is shown in FIG. 1. The shape and location of the internal egg-shaped cylinder 84 is such that an annular passage between the two cylinders 83 and 84 narrows at a point 86 to form a venturi. The cylinder 81 is mounted on one end of and concentric with a larger and second collection cylinder 90 having a cross-sectional area of roughly twice that of the chamber 82 in cylinder 81. An external, side-elevation view of this arrangement with the internal components indicated by dotted lines is shown in FIG. 2. Roughly one diameter of cylinder 84 before the end thereof, a porous diaphragm 94 normal to the axis of cylinder 90 is interposed across the collection cylinder 90 to form a sump space. A drain 96 is provided to permit removal of collected water from the sump cylinder 90. One hundred eight degrees opposite the venturi at 86 is a spiral vane 100 disposed between the walls of the cylinders 81 and 84 and starting even with the top of the two cylinders and spiraling downward at an angle between 15° and 18° ending at the location of venturi 86. The second spiral vane 102 starts again at the top of cylinders 81 and 84 and spirals downward at the same angle ending immediately under the initial point of the spiral vane 100. An inlet 106 is provided in the plate 83 above and down stream of the start of vane 100 and an outlet 108 is provided from the inside of the cylinder 84.

The operation of this arrangement is as follows, which also describes the method employed:

Air enters the system through the inlet 106 and is conducted downward to be deflected by the vane 100 into a spiral path parallel to vane 100. Vane 102 which is basically parallel to but 180° rotated from the vane 100, provides the proper pressure distribution to force the air to continue its downward spiral path, even after it leaves the end of the vane 100. Entrained water is flung by centrifugal force against the walls of cylinder 81 where it spirals down at an ever-increasing angle under the action of the pressure forces created by vanes 100 and 102 until it reaches the end of cylinder 81 which is inside and slightly below the top of collection cylinder 90. On reaching the enlargement both air and water move rapidly outward and the air velocity drops by a factor of four. The water strikes and adheres to the walls of cylinder 90 from whence it drips down past porous diaphragm 94 into the collection sump 112. The slowly moving air, free of entrained water turns and moves upward through the interior of cylinder 84 to the outlet 108. The mechanical filter may be interposed between the inlet 106 and the inlet to the outlet 108 for removal of solid matter but it is not necessary.

The intended operation of the device is move the air with as little turbulence and at as low velocity as is consistent with the goals to be attained that being high water removal efficiency. Thus, the transition between the inlet 106 and the vane 100 must be as smooth as possible. The angle of the vane 100 has been found to be important. Angles less that 15 degrees tend to promote rotation of the water about the walls of cylinder 81 without imparting sufficient downward component to force it into the sump section rapidly enough to avoid redispersion. Angles greater than 18 degrees give the air too great an axial velocity with the result that the centrifugal force acting on water particles moving through the viscous air does not have sufficient time to move the water droplets to the wall from whence they can drain into the sump, hence they remain suspended.

The egg-shaped configuration of cylinder 84 contributes to the efficiency of the device, because air entering the system at inlet port 106 is gradually accelerated in velocity by the narrowing passageway until it reaches a peak at the venturi point 86. Here the centrifugal force is at its greatest and the total path to be traversed by the innermost water particle is at its least. The air is then gradually diffused to a lower velocity as it rotates under the vane 102. A further drop in velocity and therefore, turbulence may be given by reducing the diameter of cylinder 84 below the terminal points of vanes 100 and 102 as shown in FIG. 2.

It is well known that air flow in a venturi duct section is predominantly laminar. The cross-sectional area of the spiral duct formed by top vane 100 and cylinders 81 and 84 must be so adjusted that the air velocity is not sufficient to produce the turbulence or shatter the droplets (due to shearing forces) yet does not reach a high level to assure a maximum of centrifugal force. Thus, in the most efficient embodiment of this invention means must be provided to vary the radial dimension of the passage as a function of an air flow. It has been found that optimum settings to cover a range of flows is practical.

The device handles the water laden air smoothly and with a minimum of turbulence. Air entering inlet port 106 is smoothly accelerated and smoothly decelerated reaching a peak velocity for only a short distance at point 86. This velocity may be readily controlled. The air is kept as one large mass therefore, surface area exposure is minimized and redispersion is kept to a minimum. Some slight adiabatic expansion occurs at point 86 thus cooling the air and throwing out even more moisture; however, this effect is very slight and definitely secondary to other effects.

Vanes 100 and 102 end abruptly after one-half revolution, in order, again to minimize surface exposure, to permit rapid deceleration and diffusion of the air. Furthermore, it has been found that under the action of gravity and the pressure distribution present in the centrifugal chamber collected water leaving the end of vane 100 spirals downward at an ever increasing angle and dependent on operating conditions in the chamber. Hence, prolonging the vanes prolongs opportunity for the redispersion because the air and water travel an unnatural path.

The sudden enlargement of the centrifugal chamber accomplishes several desired effects. First, the enlargement reduces the velocity of the air stream to a very low level, thus reducing turbulence and any opportunity for redispersion. Secondly, the water is flung out against the walls of collection cylinder 90 and ocmpletely away from the air stream which at this point will be beginning an inward movement in order to return up the inside of cylinder 81. The inlet diameter of cylinder 81 is selected to reduce the velocity of the exiting air to a level such that the viscous drag of the air will be sufficient to carry only the very smallest droplets as predicted by Stokes Law. However, any enlargement here is made at the expense of increased velocity in the downward moving air. Hence the diameter of cylinder 81 must be a compromise stipulated by operating conditions.

The action of the diaphragm is described in the above noted related application.

Desirably the velocity of the air should be limited to velocities below which redispersion of shattering or entrained droplets be reduced to a minimum. If low velocities are to be maintained, the relative diameters of cylinders 81 and 84 must be kept small in order to maximize centrifugal force. For flow rates of 100 to 400 scfm this device has been found most efficient if the inside diameter of cylinder 81 is approximately 4 inches the outside diameter of cylinder 84 is approximately 3 inches and the throat of venturi at 86 is adjusted depending on average air flow requirements. To force air flows larger than 300 and 400 scfm through these dimensions will produce velocities which will cause redispersion of the water. To simply enlarge cylinders 81 and 84 will increase the radii involved and hence reduce centrifugal force and separation efficiency. It becomes necessary, then, in the exercise of this invention where higher air flow rates are to be handled to manifold several centrifugal separation chambers into larger collection cylinder 90, which is a chamber, or to manifold two or more complete assemblies described above, whichever, may be done most economically.

While I have shown and described particular embodiments of my inventions and named specific parts and typical applications and examples, this is by way of illustration only and does not limit the invention to particular uses or in any way.

What is claimed is:

1. A compressed air filter comprising an upper chamber having a closed upper end and an inner wall, a plate closing said upper end and containing an inlet opening into said chamber and a centrally located outlet opening from said chamber, said inlet opening being adjacent to said inner wall, a deflector means in said inlet by which a mixture of air, solid particles oil and water droplets are moved downwardly into said upper chamber by swirling, an egg shaped tube attached to said plate within said inner wall and of length greater than the said wall to define therewith a downward opening three-dimensional annulus of varying cross-section containing the inlet opening so that the incoming swirling mixture is accelerated in passing a narrowest point thereof, a second tube having its lower end closed, a plate closing said second tube end and containing a valved opening, the inner walls of said tube and plate defining a lower chamber, attached to and larger in cross-section than said upper chamber, a porous filter means supported across said lower chamber above a sump defined on one side by the filter means and the inner walls of said second tube and plate, said filter means being below the said egg shaped tube to distribute separated liquid from said mixture passing from said inlet to said outlet.

2. The device in claim 1 said deflector means causing the air to spiral downward at an initial angle no less than 15° and no more than 18°.

3. The device in claim 1 the cross-sectional area of the lower chamber being twice the cross-sectional area of the upper chamber.

4. The device in claim 1 the narrowest dimension of the cylindrical annulus being variable to compensate for changes in airflow rate.

5. The device in claim 1 the lower end of the egg shaped tube being deformed to a circular cross-section above the point at which it enters to lower chamber.

6. The device in claim 1 said deflector means being a downwardly spiral vane disposed across said cylinderical annulus starting at the top of said annulus underneath said inlet opening 180° opposite the narrowest point of said annulus and ending at said narrowest point.

7. The device in claim 6 a second downwardly spiraling vane disposed across said annulus starting at the top of said annulus 180° opposite the inlet opening and ending at a point immediately below the start of the first vane.

* * * * *